US009394996B2

(12) United States Patent
Short et al.

(10) Patent No.: US 9,394,996 B2
(45) Date of Patent: Jul. 19, 2016

(54) SEALING DEVICE

(71) Applicant: Delavan Inc, West Des Moines, IA (US)

(72) Inventors: John Earl Short, Norwalk, IA (US);
Gregory Zink, Des Moines, IA (US);
Spencer D. Pack, Urbandale, IA (US)

(73) Assignee: Delavan Inc, West Des Moines, IA (US)

( * ) Notice: Subject to any disclaimer, the term of this patent is extended or adjusted under 35 U.S.C. 154(b) by 164 days.

(21) Appl. No.: 13/915,217

(22) Filed: Jun. 11, 2013

(65) Prior Publication Data
US 2014/0361493 A1    Dec. 11, 2014

(51) Int. Cl.
*F16J 15/08*     (2006.01)
*F16J 15/32*     (2006.01)
*F16L 23/20*     (2006.01)
*F16L 17/035*    (2006.01)
*F23R 3/28*      (2006.01)
*F02M 55/00*     (2006.01)
*F01D 11/00*     (2006.01)

(52) U.S. Cl.
CPC .......... *F16J 15/0887* (2013.01); *F16J 15/3232* (2013.01); *F16L 17/035* (2013.01); *F16L 23/20* (2013.01); *F23R 3/283* (2013.01); *F01D 11/003* (2013.01); *F02M 55/004* (2013.01); *F23R 2900/00012* (2013.01)

(58) Field of Classification Search
CPC ... F16J 15/025; F16J 15/0887; F16J 15/3232; F16L 17/03; F16L 17/035; F16L 23/18; F16L 23/20; F23R 2900/00012; F02M 55/004
USPC .......................... 277/550, 562, 567, 647–649
See application file for complete search history.

(56) References Cited

U.S. PATENT DOCUMENTS

| | | | | |
|---|---|---|---|---|
| 2,976,066 A | * | 3/1961 | Antoniades | F16J 15/3208 277/467 |
| 3,046,026 A | * | 7/1962 | Burrows | 277/643 |
| 3,098,662 A | * | 7/1963 | Iversen | 285/18 |
| 3,901,517 A | * | 8/1975 | Heathcott | F16J 15/3208 277/554 |
| 4,457,523 A | * | 7/1984 | Halling | F16J 15/021 277/644 |
| 4,471,965 A | * | 9/1984 | Jennings et al. | 277/322 |
| 5,137,259 A | * | 8/1992 | Stein | F16K 5/0673 251/174 |
| 5,240,263 A | * | 8/1993 | Nicholson | F16J 15/0893 219/137 R |
| 5,249,814 A | * | 10/1993 | Halling | F16J 15/0887 228/214 |
| 5,354,072 A | * | 10/1994 | Nicholson | F16J 15/48 277/647 |
| 5,975,589 A | * | 11/1999 | Wilkins | 285/111 |

(Continued)

*Primary Examiner* — Kristina Fulton
*Assistant Examiner* — Nicholas L Foster
(74) *Attorney, Agent, or Firm* — Locke Lord LLP; Scott D. Wofsy; Daniel J. Fiorello

(57) ABSTRACT

A sealing device is provided for use with an assembly having radially inner and outer parts in fluid communication and movable relative to one another. The sealing device includes a first annular lip which defines an opening for receiving the radially inner part, and an annular channel disposed radially outward of the opening. The first annular lip is configured and adapted for deformation and compressive sealed engagement with the radially inner part while permitting movement of the radially inner part relative thereto. An annular body integrally formed with the first annular lip of the sealing device defines an interior space in communication with the annular channel and the opening. The annular body extends radially outward of the first annular lip and is configured and adapted for sealed engagement with the radially outer part.

15 Claims, 3 Drawing Sheets

(56) References Cited

U.S. PATENT DOCUMENTS

| | | | |
|---|---|---|---|
| 6,179,002 B1 * | 1/2001 | Smith, III | F16L 1/26 137/614 |
| 6,443,459 B2 * | 9/2002 | Lebeau | F16J 15/44 277/372 |
| 8,152,172 B2 * | 4/2012 | Halling | F16J 15/022 277/644 |
| 2005/0082764 A1 * | 4/2005 | Smith, III | 277/323 |
| 2007/0222157 A1 * | 9/2007 | Kondo | F02M 59/442 277/345 |
| 2010/0259016 A1 * | 10/2010 | Halling | 277/644 |
| 2011/0049815 A1 * | 3/2011 | Wagner | F16J 15/3224 277/650 |
| 2011/0179798 A1 * | 7/2011 | Pieussergues | F01D 9/023 60/752 |
| 2011/0272892 A1 * | 11/2011 | Grace et al. | 277/395 |
| 2012/0319358 A1 * | 12/2012 | Toth | F16J 15/3268 277/549 |

* cited by examiner

SEALING DEVICE

BACKGROUND OF THE INVENTION

1. Field of the Invention

The present invention relates to sealing devices, and more particularly, to sealing devices for use with fluidly coupled parts in high temperature environments such as those found in gas turbine engines.

2. Description of Related Art

Assemblies such as fuel injectors which utilize fluidly coupled components in high temperature environments often require delivery of the fuel from an inlet fitting, where the fuel is relatively cool, through a feed arm, to an injector tip, where the fuel is combined with hot combustion air. As a result, the assemblies experience significant temperature variation between the inlet fitting and the injector tip. Temperature variation also occurs at particular locations in the assembly as the engine is operated at startup and at full power. These and other causes of temperature variation result in thermal expansion and contraction of assembly parts, which can lead to seal failures. For example, the growth differential of one or more parts caused by a hot feed arm and a cool fuel delivery tube can be exacerbated by the relatively long distances over which the fuel is transported.

Various methods have been utilized to accommodate growth differentials of assembly components, including, for example, coiling the fuel tube, utilizing O-rings and incorporating stretchable bellows. The drawbacks of these methods include the limited amount of assembly space typically available, the limited durability of the seals at high temperatures, their lack of serviceability, the long lead times for obtaining them, and high cost.

Such conventional methods and systems have generally been considered satisfactory for their intended purpose. However, there is still a need in the art for improved sealing capability with seals that are easily manufactured, assembled, and replaced, and which function with increased longevity.

SUMMARY OF THE INVENTION

The subject invention is directed to a new and useful sealing device for use with radially inner and outer parts which are in fluid communication and movable relative to one another. The sealing device includes a first annular lip which defines an opening for receiving the radially inner part, and an annular channel disposed radially outward of the opening. The first annular lip is configured and adapted for deformation and compressive sealed engagement with the radially inner part while permitting movement of the radially inner part relative thereto. An annular body integrally formed with the first annular lip defines an interior space in communication with the annular channel and the opening. The annular body extends radially outward of the first annular lip, and is configured and adapted for sealed engagement with the radially outer part.

In certain embodiments, the sealing device includes a second annular lip integrally formed with the body. The second annular lip is configured and adapted for deformation and compressive sealed engagement with the radially outer part, and defines a channel disposed radially outward of the channel defined by the first annular lip. In certain embodiments, the first and second annular lips extend from opposite sides of the body, are provided with C-shaped cross sections, and are configured and adapted for elastic deformation to provide the compressive sealed engagements with the radially inner and outer parts. In accordance with certain embodiments, the first and second annular lips include respective convex outer surfaces and concave inner surfaces, and are configured and adapted to provide the respective sealed engagements with the radially inner and outer parts when temperatures within the interior space of the body are from cryogenic to 1300° F. (700° C.).

In certain embodiments, the first annular lip is configured and adapted for deformation to form an axial seal with a wall of the radially inner part oriented in an axial direction, parallel to a longitudinal axis of the sealing device. The second annular lip is configured and adapted for deformation to form a face seal with a wall of the radially outer part oriented in a radial direction, substantially perpendicular to the axial direction.

In accordance with certain embodiments, the first annular lip includes a concavity in a direction substantially parallel to the axial direction, and the second annular lip includes a concavity substantially in the radial direction. The first and second annular lips are configured and adapted such that increased pressure within the interior space of the body causes increased compressive forces and sealed engagement of the first and second annular lips against the radially inner and outer parts.

In certain embodiments, the body is configured and adapted for static sealed engagement with the radially outer part, and includes a concave outer surface integrally formed with a convex outer surface of the first annular lip.

In accordance with certain embodiments, a seal assembly is provided which includes a radially outer part, a radially inner part in fluid communication with and movable relative to the radially outer part, and a seal device operatively associated with the radially inner part and the radially outer part. The seal device includes a first annular lip defining an opening, and an annular channel disposed radially outward of the opening. The first annular lip is configured and adapted for compressive sealed engagement with the radially inner part while permitting movement relative thereto. The seal device includes an annular body integrally formed with the first annular lip, and defines an interior space in communication with the annular channel and the opening. The body of the seal device extends radially outward of the first annular lip, and is configured and adapted for sealed engagement with the radially outer part. The seal device also includes a second annular lip integrally formed with the body configured and adapted for compressive sealed engagement with the radially outer part. In accordance with one aspect of the invention, the seal of the seal assembly is configured and adapted to provide the respective sealed engagements of the first and second annular lips with the radially inner and outer parts with temperatures within the interior space of the body up to 1300° F. (700° C.).

The seal devices and assemblies of the present invention provide compact, high temperature, replaceable, low cost options for numerous applications, including those in which a sliding axial seal is required.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein:

FIG. 2b is a cut isometric view of the sealing device of FIG. 2a;

These and other features of the systems and methods of the subject invention will become more readily apparent to those skilled in the art from the following detailed description of the preferred embodiments taken in conjunction with the drawings.

DETAILED DESCRIPTION OF THE PREFERRED EMBODIMENTS

Figure 1:
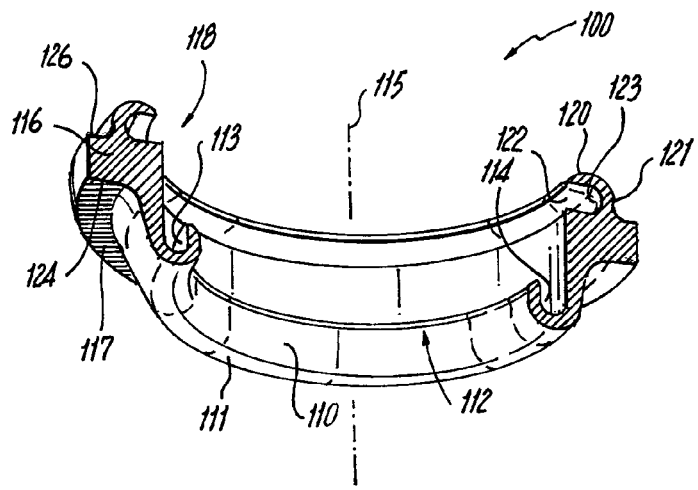
FIG. 1 is a cut isometric view of an exemplary embodiment of a sealing device constructed in accordance with the present invention.

Reference will now be made to the drawings wherein like reference numerals identify similar structural features or aspects of the subject invention. For purposes of explanation and illustration, and not limitation, a partial view of an exemplary embodiment of the sealing device in accordance with the invention is shown in FIG. 1 and is designated generally by reference character 100. Additional exemplary embodiments of the sealing device and assemblies operatively associated therewith in accordance with the invention are shown in FIGS. 2a-6, and are further described below.

Figure 3:
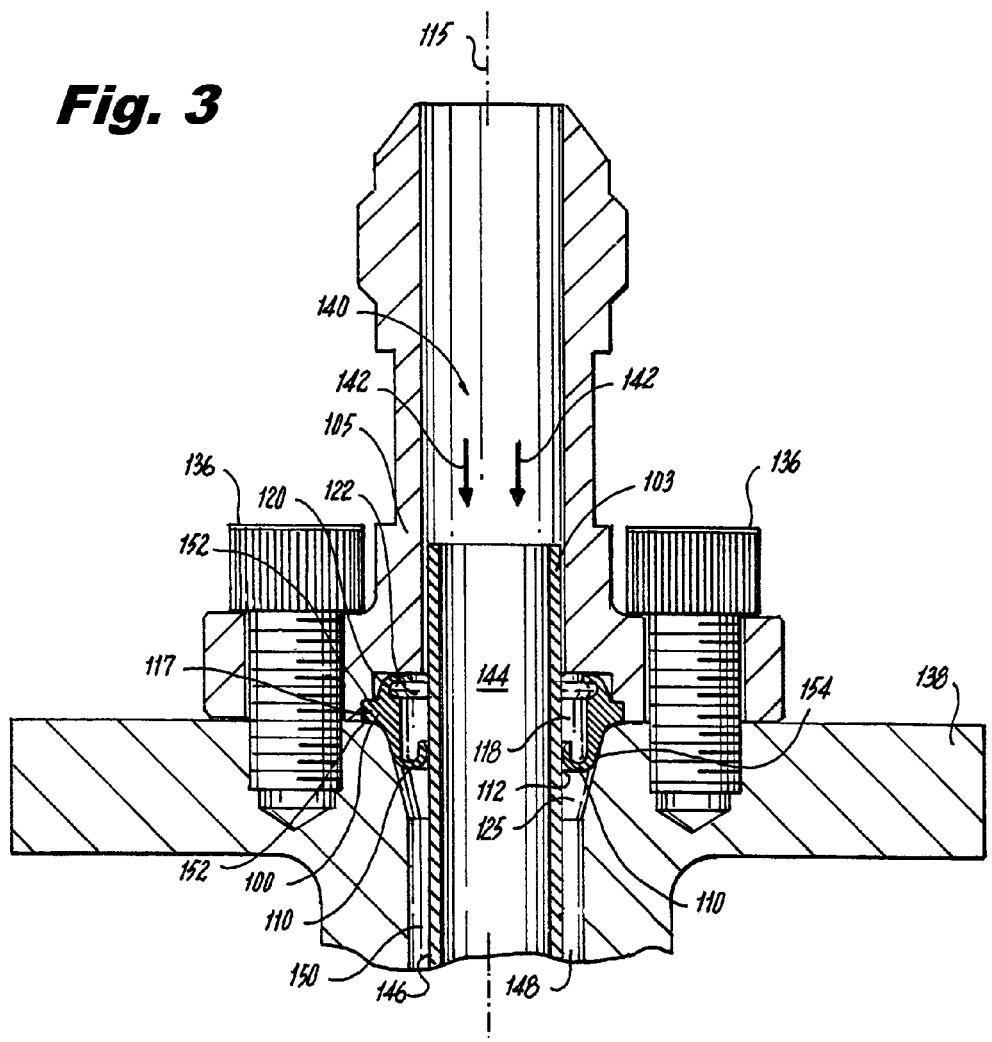
FIG. 3 is a cross-section view of the sealing device of FIG. 1 assembled between radially inner and outer fluidly coupled parts of a first assembly.
Figure 4:
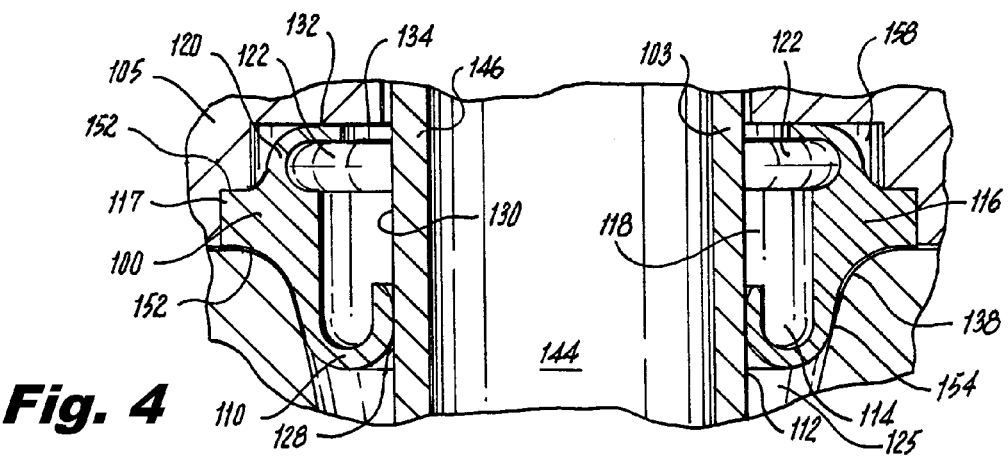
FIG. 4 is an enlarged partial view of the sealing device and first assembly of FIG. 3.

Continuing primarily with FIG. 1 with additional reference to FIGS. 3 and 4, sealing device 100 is provided for use with radially inner and outer parts 103, 105, 138 (FIGS. 3, 4) which are in fluid communication and movable relative to one another. Sealing device 100 includes a first annular lip 110 which defines an opening 112 for receiving radially inner part 103, and an annular channel 114 disposed radially outward of opening 112. First annular lip 110 is configured and adapted for deformation and compressive sealed engagement with radially inner part 103 while permitting movement of radially inner part 103 relative thereto. An annular body 116 integrally formed with first annular lip 110 defines an interior space 118 in communication with annular channel 114 and opening 112. Annular body 116 extends radially outward of first annular lip 110 via a flange 117, and is configured and adapted for sealed engagement with radially outer part 105 via flange 117.

Sealing device 100 also includes a second annular lip 120 integrally formed with body 116. Second annular lip 120 is configured and adapted for deformation and compressive sealed engagement with radially outer part 105, and defines a channel 122 disposed radially outward of channel 114 defined by first annular lip 110. First and second annular lips 110, 120 extend from opposite respective sides 124, 126 of body 116, and are provided with C-shaped cross sections as shown. First and second annular lips 110, 120 can be configured and adapted for elastic deformation to provide the compressive sealed engagements with the radially inner and outer parts 103, 105, 138. As shown, first and second annular lips 110, 120 can include respective convex outer surfaces 111, 121 and concave inner surfaces 113, 123, and can be configured and adapted to provide the respective sealed engagements with radially inner and outer parts 103, 105, 138. It is anticipated that sealing device 100 can operate to provide such sealed engagements at temperatures up to 1300° F. (700° C.).

Continuing with FIG. 1, channel 114 defined by first annular lip 110 includes a concavity extending in a direction substantially parallel to a longitudinal axis 115 of the sealing device 100, and channel 122 defined by second annular lip 120 includes a concavity extending in a radial direction substantially perpendicular to longitudinal axis 115. First and second annular lips 110, 120 are preferably configured and adapted such that increased pressure within interior space 118 of body 116 causes increased compressive forces and sealed engagement of first and second annular lips 110, 120 against the radially inner and outer parts 103, 105, 138.

Turning now to FIGS. 3 and 4, a cross-section of sealing device 100 is shown incorporated in a typical sealing application. It will be appreciated that sealing device 100 can be sized to accommodate particular assemblies and their respective geometries while maintaining various features described above, including first and second annular lips 110, 120 and annular body 116 with flange 117. Sizing of the sealing device 100 will depend on the particular crush needed, the taper and lead-in radii of the seal cavity 125, the shaft-seal oversize value (e.g., the extent of expected longitudinal or radial expansion of the fluidly coupled inner and outer radial members on account of temperature variation). Sealing device 100 is preferably formed as an integrated metal seal using, for example, Metallic 300 Series Stainless Steel, Inconel 718, or other alloy steels. The sealing device 100 may be plated with a material such as Silver or Nickel to aid sealing. It will be appreciated that the ideal material to utilize for a given seal will depend on the maximum continuous operating temperature recommended for the seal material, the type of seal utilized, and the extent of anticipated periodic rises above the continuous operating temperature.

The annular lips 110, 120 are preferably formed to be elastically deformable and maintain such elastic properties after repeated cycling of temperatures, though plastically deformable seals may also be utilized if operating conditions allow for such use.

Continuing with FIG. 3, bolts 136 are tightened to sandwich radially outer part 105 (e.g., an upper fitting) to a housing 138. Such tightening increases compressive forces on sealing device 100, and in particular, on upper and lower lips 110, 120 and flange 117, causing them to deform and compressively engage inner and outer radial parts 103, 105, 138. Radially outer part 105 is configured with a channel 140 for transporting a fluid in the direction of the arrows 142. Channel 140 is fluidly coupled with a channel 144 defined by radially inner part 103. As shown, the outer diameter of the radially inner part 103 is smaller than the inner diameter of the radially outer part 105 in order to accommodate radial and longitudinal expansion and contraction (e.g., shifting) of the assembly parts relative to one another due to thermal changes, thus leaving a small annular gap 146 therebetween. Similarly housing 138 defines a channel 148 having a larger diameter than the outer diameter of the radially inner part 103. It will be appreciated, then, that pressurized fluid flowing through channel 140 in the direction of arrows 142 can, in addition to flowing into channel 144, leak through annular gap 146.

Absent sealing device 100, such pressurized fluid could continue flowing into annular gap 150 radially outward of inner part 103. Sealing device 100 thus prevents pressurized fluid from flowing into channel 148.

As best shown in FIG. 4, first annular lip 110 is configured and adapted for deformation to form an axial seal 128 between the lip 110 and an axially extending (e.g., substantially parallel to longitudinal axis 115 of sealing device 100) wall 130 of the radially inner part 103. As also shown in FIG. 4, second annular lip 120 is configured and adapted for deformation to form a face seal 132 with a radially extending (e.g., substantially perpendicular to longitudinal axis 115) wall 134 of the radially outer part 105. It will be appreciated that axial seal 128 and face seal 132 are formed when first and second annular lips 110, 120 are compressed upon installation via press fit into cavity 125, and further compressed via tightening of bolts 136.

Additionally, it will be appreciated that pressurized fluid reaching interior space 118 will cause first and second annular lips 110, 120 to increase the pressure on seals 128, 132 on account of the preferably elastic and flexible C-shaped cross sections of the lips 110, 120 since the respective concavities defined by the lips 110, 120 face the pressured fluid. Flange 117 of sealing device 100 provides one or more backup seals 152 where flange 117 mates with horizontal walls of the radially outer parts 105 and 138.

A backup seal 154 may also be provided, for example, where first annular lip 110 interfaces to housing 138. Flange 117 may be configured to compress slightly along its perimeter, but can additionally or alternatively function to form a static sealed engagement with the radially outer parts 105 and 138. In this manner, if axial seal 128 or face seal 132 fails (e.g., if pressurized fluid is able to bypass seal 128 or 132), and pressurized fluid flows radially outward of inner part 103 into channel 148 or 158, then such leak does not become an overboard leak as it is contained by backup seals 152, 154. It will be appreciated that the sealing device 100 functions to provide seals to three parts at once, namely inner radial part 103, outer radial part 105, and housing 138 via compressive seals 128, 132, 152, and 154.

The materials utilized for the sealing device 100 should be sufficient to deform into respective mating cavities within housing 138, but provide sufficient elastic properties to maintain pressure at the seal points under all operating conditions. For example, Inconel 718 or a 300 Stainless Steel may be utilized. Plating such as Silver or Nickel may be employed to increase the effectiveness of the seals provided by the sealing device 100. It will be appreciated that such materials may be employed in high temperature environments where rubber O-rings and the like would fail. It will also be appreciated by those skilled in the art that by providing sealing along opposite (e.g., orthogonal) surfaces of inner and outer parts, as well as backup seals, the sealing device 100 provides functionality that would otherwise require two or more separate sealing devices.

Figure 2A:
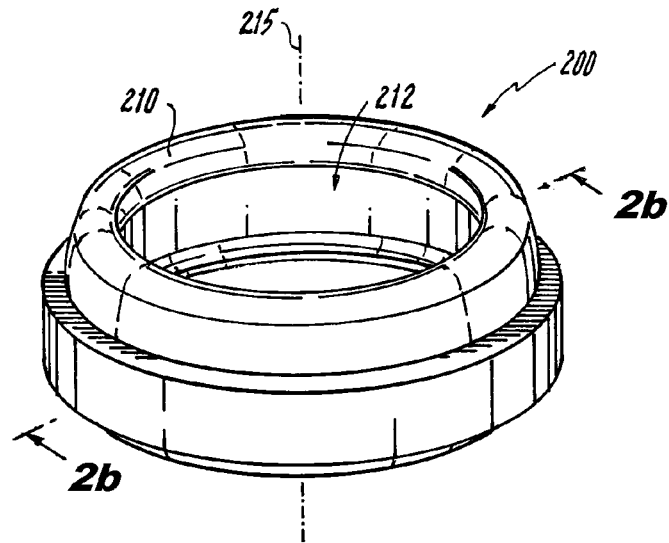
FIG. 2a is an isometric view of a second exemplary embodiment of a sealing device constructed in accordance with the present invention.
Figure 2B:
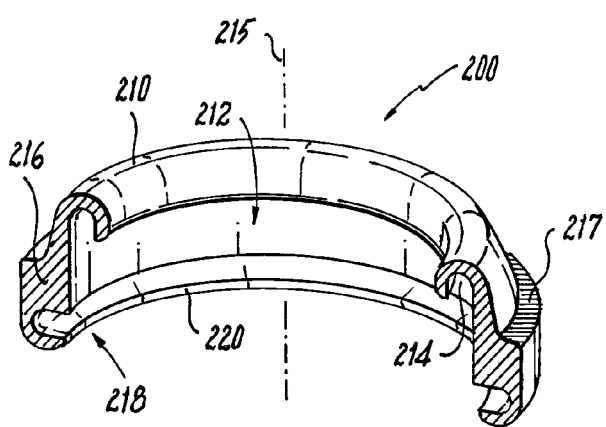
Figure 5:
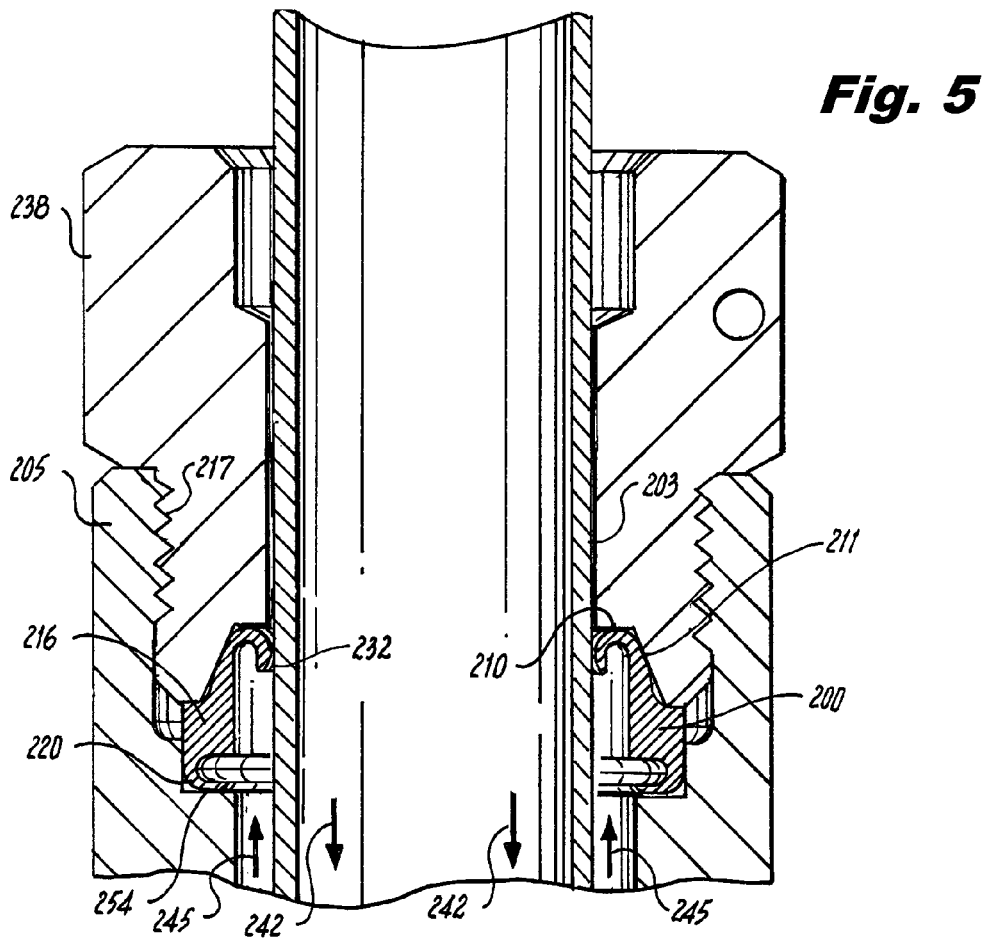
FIG. 5 is a cross-section view of the sealing device of FIG. 2a assembled between radially inner and outer fluidly coupled parts of a second assembly.

Turning now primarily to FIGS. 2a, 2b with additional reference to FIG. 5, a sealing device 200 is shown which is similar to sealing device 100. Sealing device 200 includes a first annular lip 210 which defines an opening 212 for receiving radially inner part 203 (FIG. 5), a second annular lip 220, and an annular channel 214 disposed radially outward of opening 212. The lips 210, 220 function similar to lips 110, 120. For example, first annular lip 210 is configured and adapted for deformation and compressive sealed engagement with radially inner part 203 while permitting movement of radially inner part 203 relative thereto. An annular body 216 integrally formed with first annular lip 210 defines an interior space 218 in communication with annular channel 214 and opening 212. Annular body 216 extends radially outward of first annular lip 210, and is configured and adapted for sealed engagement with radially outer part 205.

It will be appreciated that the primary difference between sealing device 200 and sealing device 100 is that body 216 of sealing device 200 has a radially reduced flange portion 217 relative to flange portion 117 of sealing device 100, rendering it appropriate for the geometry of the assembly of FIG. 5.

Turning now to FIG. 5, a cross-section of sealing device 200 of FIGS. 2a, 2b is shown incorporated in another exemplary assembly in accordance with the present invention. Radially inner part 203 is coupled to radially outer parts 205, 238 by, for example, a threaded engagement at threads 217. In this example, the radial inner part 203 forms a hydraulic passage such as a fuel inlet which would typically be attached to an inlet fitting above and a injector tip below, conveying fuel in direction of arrows 242. Although the hydraulic passage is sealed, the coupling shown has gaps between the radially inner and outer parts 203, 205, 238 which can allow pressurized air such as combustion air flowing in the direction of arrows 245 to flow radially outward (e.g., outboard) of the portion of radially inner part 203 threadably coupled to radially outer part 205. Sealing device 200 blocks air flow radially outward of radially inner part 203 via seals 232, 254. Seal 232 is formed by compressive deformation of first annular lip 210 against a wall 211 of the radially inner part 203 extending traverse (e.g., at an angle) relative to a longitudinal axis 215 (FIG. 2b) of sealing device 200. Seal 254 is formed by compressive deformation of second annular lip 220 against radially outer part 205.

First annular lip 210 and second annular lip 220 form respective concavities facing the pressurized air. Thus, pressurized air within these concavities increases the sealing pressure of seals 232, 254. In this manner, sealing device 200 functions to provide seals between inner and outer parts 203, 205, 238. It will be appreciated that in addition to sealing combustion air seal 200 could also be used to seal leaks of any other type of liquid or gas surrounding inner part 203.

Figure 6:
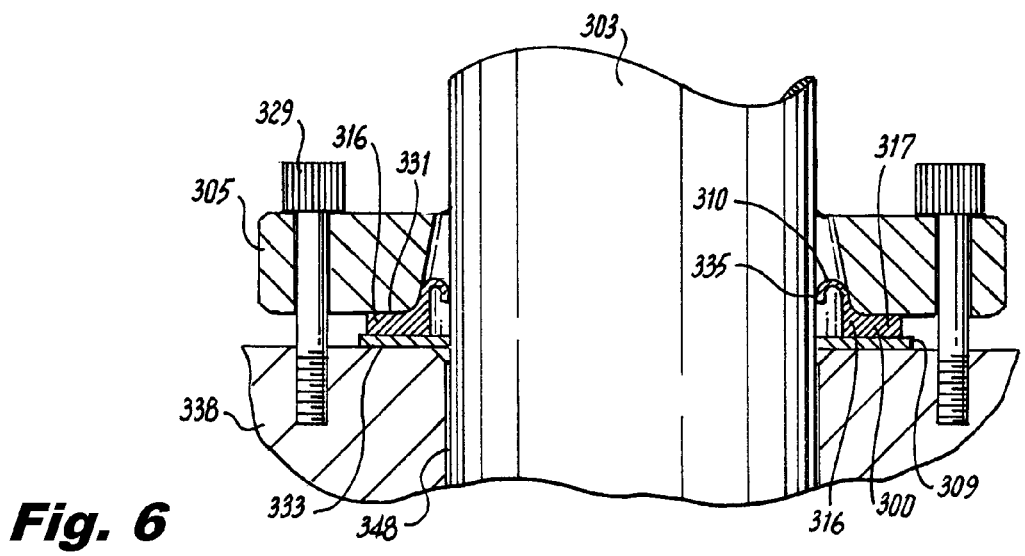
FIG. 6 is a cross-section view of a third exemplary embodiment of a sealing device constructed in accordance with the present invention and assembled between radially inner and outer fluidly coupled parts of a third assembly.

Turning now to FIG. 6, a cross-section of a third exemplary sealing device 300 is shown incorporated into a third exemplary assembly in accordance with the present invention. Sealing device 300 is similar to sealing device 200, except that its body 316 includes a flange 317 which is elongated, and it contains no second annular lip. Radially inner part 303 extends through a housing 338 and a radially outer part 305. A gasket 309 is provided under seal device 300, and bolts 329 are tightened to sandwich radially outer part 305 to a housing 338. Such tightening increases compressive forces on sealing device 100 and gasket 309. Pressurized air present in the annular gap 348, absent sealing device 300, would flow radially outward under and/or beyond radially outer part 305.

During assembly, it will be appreciated that compressive forces of the bolts 329 will cause annular lip 310 to deform and press against radially outer part 305 and radially inner part 303. Additionally, as pressure increases from internal air, such as combustor air, in gap 348, pressure will increase within the concavity defined by annular lip 310, and thus enhance the effectiveness of the axial seal 335 formed between radially inner part 303 and lip 310. The body 316 of sealing device 300 and gasket 309 provide respective seals 331, 333 between body 316 and outer radial part 305, and between gasket 309 and housing 338.

The seal devices and assemblies of the present invention provide compact, high temperature, replaceable, low cost options for numerous applications, including those in which a sliding axial seal is required. While the seal devices, associated assemblies, and methods of operation of the subject invention have been shown and described with reference to preferred embodiments, those skilled in the art will readily appreciate that changes and/or modifications may be made thereto without departing from the spirit and scope of the subject invention. For example, while annular lips, bodies, and flanges of seal devices have been disclosed in varying proportions, it will be appreciated that other shapes and proportions may be utilized. While particular materials have been disclosed for the sealing devices, it will be appreciated that other materials may be utilized. Additionally, while the seal devices and assemblies of the present invention have been described with respect to, for example, fuel injectors and gas turbine engines, other applications may be utilized. It will be appreciated that fluid flowing through the assemblies disclosed herein may be a gas or a liquid, and may be any type of fluid, such as, for example, air, or fuel in liquid or gaseous form. Thus, those skilled in the art will readily appreciate that changes and/or modifications may be made to the seal devices and assemblies disclosed herein without departing from the spirit and scope of the subject invention.

What is claimed is:

1. A sealing device for use with an assembly having radially inner and outer parts in fluid communication and movable relative to one another, the sealing device comprising:
   a first annular lip which defines an opening for receiving the radially inner part, wherein the first annular lip also defines an annular channel disposed radially outward of the opening, the first annular lip configured and adapted for deformation and compressive sealed engagement with the radially inner part while permitting movement of at least one of the radially inner and outer parts relative thereto, wherein the first annular lip curves radially inward from an annular body such that it radially overlaps itself;
   a second annular lip integrally formed with the annular body, the second annular lip configured and adapted for deformation and compressive sealed engagement with the radially outer part; and
   the annular body integrally formed with the first annular lip and defining an interior space in communication with the annular channel and the opening, the annular body extending radially outward of the first annular lip via a flange and configured and adapted for sealed engagement with the radially outer part via the flange, wherein the annular body is thicker than the first annular lip and the flange extends radially outward from the annular body;
   wherein the first and second annular lips extend from opposite sides of the annular body,
   wherein the first and second annular lips each have a C-shaped cross section which are perpendicular in direction of curvature relative to each other,
   wherein the first annular lip extends further radially inward than the second annular lip, and
   wherein the sealing device is formed from one of a metal and a metal alloy.

2. A sealing device according to claim 1, wherein the body is configured and adapted for static sealed engagement with the radially outer part via the flange.

3. A sealing device according to claim 1, wherein the first annular lip and body are configured and adapted to provide respective sealed engagements with the radially inner and outer parts with temperatures within the interior space of the body at cryogenic temperatures.

4. A sealing device according to claim 3, wherein the first annular lip and body are additionally configured and adapted to provide respective sealed engagements with the radially inner and outer parts with temperatures within the interior space of the body at temperatures up to 1,300° F. (700° C.).

5. A sealing device according to claim 1, wherein the first annular lip is configured and adapted for elastic deformation to provide the compressive sealed engagement with the radially inner part.

6. A sealing device according to claim 1, wherein the body includes a concave outer surface integrally formed with a convex outer surface of the first annular lip.

7. A sealing device according to claim 1, wherein both the body and the second annular lip are configured and adapted for static sealed engagement with the radially outer part.

8. A sealing device according to claim 1, wherein the second annular lip defines a channel disposed radially outward of the channel defined by the first annular lip.

9. A sealing device according to claim 8, wherein the first annular lip includes a concavity in a direction substantially parallel to a longitudinal axis of the sealing device, and the second annular lip includes a concavity in a direction substantially perpendicular to the longitudinal axis of the sealing device.

10. A sealing device according to claim 1, wherein the first and second annular lips have respective convex outer surfaces and concave inner surfaces.

11. A sealing device according to claim 1, wherein the first annular lip is configured and adapted for deformation to form an axial seal with a wall of the radially inner part oriented in an axial direction, and the second annular lip is configured and adapted for deformation to form a face seal with a wall of the radially outer part oriented in a radial direction perpendicular to the axial direction.

12. A sealing device for use with an assembly having radially inner and outer parts in fluid communication and movable relative to one another, the sealing device comprising:
   a first annular lip which defines an opening for receiving the radially inner part, wherein the first annular lip also defines an annular channel disposed radially outward of the opening, the first annular lip configured and adapted for elastic deformation and compressive sealed engagement with the radially inner part while permitting movement of the radially inner part relative thereto, wherein the first annular lip curves radially inward from an annular body such that it radially overlaps itself;
   the annular body integrally formed with the first annular lip and defining an interior space in communication with the annular channel and the opening, the annular body extending radially outward of the first annular lip via a flange and configured and adapted for sealed engagement with the radially outer part via the flange, wherein the annular body is thicker than the first annular lip and the flange extends radially outward from the annular body; and
   a second annular lip integrally formed with the body, the second annular lip configured and adapted for deformation and compressive sealed engagement with the radially outer part, and defining a channel disposed radially outward of the channel defined by the first annular lip
   wherein the first and second annular lips extend from opposite sides of the annular body,
   wherein the first and second annular lips each have a C-shaped cross section which are perpendicular in direction of curvature relative to each other;
   wherein the first annular lip extends further radially inward than the second annular lip, wherein the sealing device is formed from one of a metal and a metal alloy, and wherein the first and second annular lips and the body are configured and adapted to provide respective compressive sealed engagements with the radially inner and outer parts with temperatures within the interior space of the body exceeding 1000° F. (538° C.).

13. A sealing device according to claim 12, wherein the first annular lip includes a concavity in a direction substantially parallel to a longitudinal axis of the sealing device, and the second annular lip includes a concavity in a direction substantially perpendicular to the longitudinal axis of the sealing device.

14. A sealing device according to claim 12, wherein the first and second annular lips are configured and adapted such that increased pressure within the interior space of the body causes increased compressive forces and sealed engagement of the first and second annular lips against the radially inner and outer parts of the assembly.

15. A seal assembly, comprising:
a radially outer part;
a radially inner part in fluid communication with and movable relative to the radially outer part; and
a seal operatively associated with the radially inner part and the radially outer part, the seal including:
(i) a first annular lip defining an opening and an annular channel disposed radially outward of the opening, the first annular lip configured and adapted for compressive sealed engagement with the radially inner part while permitting movement relative thereto, wherein the first annular lip curves radially inward from an annular body such that it radially overlaps itself;
(ii) a second annular lip integrally formed with the annular body, the second annular lip configured and adapted for compressive sealed engagement with the radially outer part; and
(iii) the annular body integrally formed with the first annular lip and defining an interior space in communication with the annular channel and the opening, the body extending radially outward of the first annular lip via a flange and configured and adapted for sealed engagement with the radially outer part via the flange, wherein the annular body is thicker than the first annular lip and the flange extends radially outward from the annular body;

wherein the first and second annular lips extend from opposite sides of the annular body, wherein the first and second annular lips each have a C-shaped cross section which are perpendicular in direction of curvature relative to each other, wherein the first annular lip extends further radially inward than the second annular lip, and wherein the sealing device is formed from one of a metal and a metal alloy.

* * * * *